(12) United States Patent
Pylappan et al.

(10) Patent No.: US 10,536,812 B2
(45) Date of Patent: Jan. 14, 2020

(54) CONTENT PROVIDING BASED ON LOCATION DETERMINATION USING SENSOR DATA

(71) Applicant: Curbside Inc., Palo Alto, CA (US)

(72) Inventors: Seejo Pylappan, Cupertino, CA (US); Denis Laprise, Sunnyvale, CA (US); Jaron Waldman, Palo Alto, CA (US)

(73) Assignee: CURBSIDE INC., Palo Alto, CA (US)

( * ) Notice: Subject to any disclaimer, the term of this patent is extended or adjusted under 35 U.S.C. 154(b) by 0 days.

(21) Appl. No.: 16/167,658

(22) Filed: Oct. 23, 2018

(65) Prior Publication Data

US 2019/0342716 A1 Nov. 7, 2019

Related U.S. Application Data

(60) Provisional application No. 62/666,416, filed on May 3, 2018, provisional application No. 62/666,451, filed on May 3, 2018.

(51) Int. Cl.
*H04W 24/00* (2009.01)
*H04W 4/029* (2018.01)
(Continued)

(52) U.S. Cl.
CPC ............ *H04W 4/029* (2018.02); *H04L 67/18* (2013.01); *H04W 4/23* (2018.02); *H04W 4/38* (2018.02); *G01S 19/13* (2013.01)

(58) Field of Classification Search
CPC ......... H04W 4/029; H04W 4/23; H04W 4/38; H04L 67/18; G01S 19/13
(Continued)

(56) References Cited

U.S. PATENT DOCUMENTS 10,013,462 B2 * 7/2018 Priness ................. G06Q 30/06
2008/0248815 A1 10/2008 Busch
(Continued)

FOREIGN PATENT DOCUMENTS

WO WO-2009/021068 A1 2/2009

OTHER PUBLICATIONS

International Search Report and Written Opinion dated Jul. 16, 2019 for corresponding PCT Application No. PCT/US2019/030557.

*Primary Examiner* — Amancio Gonzalez
(74) *Attorney, Agent, or Firm* — Polsinelli PC

(57) ABSTRACT

The present disclosure enables an improved location determination and subsequent content providing. In one aspect, a method includes assigning a geographical tile to a tracking device, the geographical tile representing a geographical location in which the tracking device is currently located; activating at least one sensor on-board the tracking device, the at least one sensor of the tracking device being used to collect location data and determine displacement information of the tracking device on the tracking device; receiving the displacement information as well as at least one satellite based location update from the tracking device; determining at least one zone of interest in the tile at which the tracking device is currently located based on the displacement information and at least one satellite based location information of the tracking device; and providing at least one content associated with the at least one zone of interest to the tracking device.

20 Claims, 7 Drawing Sheets

(51) Int. Cl.
*H04W 4/38* (2018.01)
*H04L 29/08* (2006.01)
*H04W 4/23* (2018.01)
*G01S 19/13* (2010.01)

(58) Field of Classification Search
USPC ..................................................... 455/456.1
See application file for complete search history.

(56) References Cited

U.S. PATENT DOCUMENTS

2008/0270233 A1    10/2008   Yip et al.
2016/0189098 A1*   6/2016   Beaurepaire ....... G06Q 10/0835
                                                                 705/337
2018/0338237 A1*   11/2018   Maheswaranathan .. H04W 4/90

\* cited by examiner

US 10,536,812 B2

CONTENT PROVIDING BASED ON LOCATION DETERMINATION USING SENSOR DATA

PRIORITY INFORMATION

This Application claims priority to U.S. Provisional Application 62/666,416 filed on May 3, 2018 and U.S. Provisional Application 62/666,451 filed on May 3, 2018, the entire content of both of which are incorporated herein by reference.

TECHNICAL FIELD

The present technology pertains to systems and methods for improving location determination of tracking devices, and more specifically to providing content to such tracking devices based on an improved location determination method that relies on on-board sensor data of the tracking device in addition to satellite signals.

BACKGROUND

Location determination often relies on receiving continuous location updates from a moving target (e.g., a vehicle). The requirement for such continuous transmission of location updates from a tracking device (e.g., a mobile device) associated with the moving target to the server, requires the server to obtain accurate location information (e.g., accurate reading of global positioning system (GPS) signals from the tracking device). However, there are many geographical areas in which a tracking device may not be able to obtain accurate GPS signals due to the existence of many structures and buildings in the surrounding areas of the tracking device (e.g., in a downtown area, under a bridge, in a secure building, in a mall, etc.). This can adversely affect the reading provided by the tracking device to a server. Furthermore, the accuracy of GPS signals may not be sufficient to distinguish relatively small movement of mobile devices within a given structure (e.g., from one store to an adjacent one in a shopping mall).

Unavailability of accurate GPS signals and/or inability of detecting small variations in movement of tracking devices by relying on GPS signals alone, can directly and adversely affect content provided to users of such tracking devices.

SUMMARY

Example embodiments are provided for using on-board sensor data of a tracking device in addition to satellite signals to improve the determination of the location of a tracking device and hence improve the targeted content pushed to such a tracking device based on the improved determination of the location of the tracking device.

In one aspect, a computer-implemented method of targeted content providing includes assigning a geographical tile to a tracking device, the geographical tile representing a geographical location in which the tracking device is currently located; activating at least one sensor on-board the tracking device, the at least one sensor of the tracking device being used to collect location data and determine displacement information of the tracking device on the tracking device; receiving the displacement information as well as at least one satellite based location update from the tracking device; determining at least one zone of interest in the tile at which the tracking device is currently located based on the displacement information and at least one satellite based location information of the tracking device; and providing at least one content associated with the at least one zone of interest to the tracking device.

In one aspect, a device includes memory having computer-readable instructions stored therein; and one or more processors. The one or more processors are configured to execute the computer-readable instructions to receive a geographical tile from a server, the geographical tile representing a geographical location in which the device is currently located; receive a plurality of content associated with the geographical tile from the server; determine displacement information of the device within the tile using a reference point and displacement data obtained via at least one on-board sensor of the device; determine a presence of the device within a zone of interest in the tile based on the displacement information; and activate at least one content corresponding the zone of interest.

In one aspect, a device includes memory having computer-readable instructions stored therein; and one or more processors. The one or more processors are configured to execute the computer-readable instructions to assign a geographical tile to a tracking device, the geographical tile representing a geographical location in which the tracking device is currently located; activate at least one sensor on-board the tracking device, the at least one sensor of the tracking device being used to collect location data and determine displacement information of the tracking device on the tracking device; receive the displacement information as well as at least one satellite based location update from the tracking device; determine at least one zone of interest in the tile at which the tracking device is currently located based on the displacement information and at least one satellite based location information of the tracking device; and provide at least one content associated with the at least one zone of interest to the tracking device.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art to obtain accurate readings of a location of a tracking device using on-board sensor data in addition to GPS signals alone may not be sufficiently accurate. This improved location determination technique can in turn improve the accuracy of providing a user associated with the tracking device with more targeted content.

The disclosure begins with a description of several example systems in which the concepts described herein can be implemented.

Figure 1:
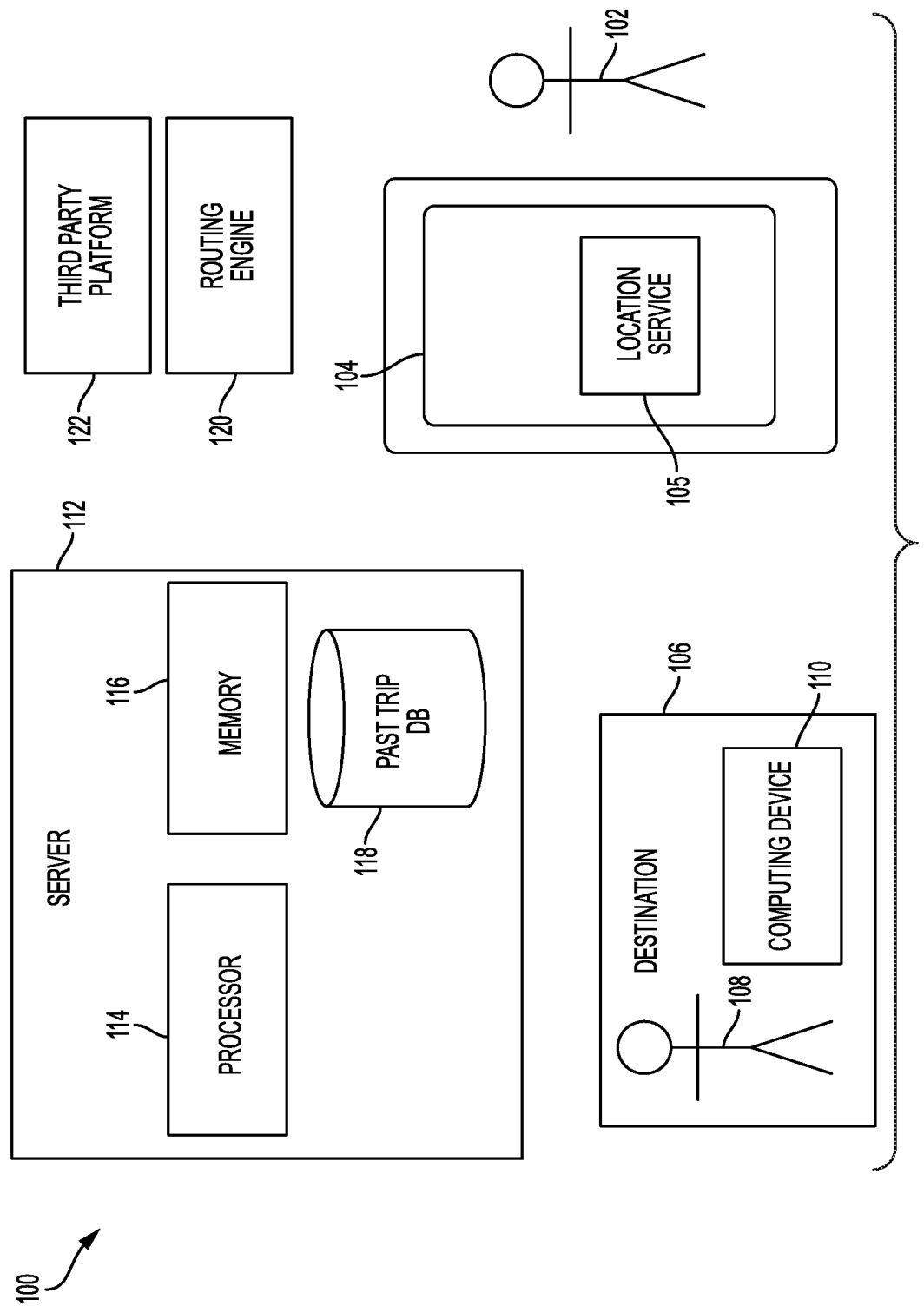
FIG. 1 shows an example system, in accordance with one aspect of the present disclosure.

FIG. 1 illustrates an example system, in accordance with one aspect of the present disclosure. As illustrated in FIG. 1, system 100 includes a user 102 associated with a tracking device 104 (user device 104 or customer device 104). While not shown in FIG. 1, user 102 and tracking device 104 can be associated with a moving object including, but not limited to, a car, a bus, a bike, a public transportation vehicle, etc. The tracking device 104 can be any known or to be developed electronic device capable of tracking a movement of the user 102 (and the associated moving object) and communication the same with a server 112 over a wired and/or wireless communication platform such as over a cellular network or a WiFi connection. Examples of tracking device 104 include, but are not limited to, a cellular phone, a personal digital assistant (PDA), a laptop, a tablet, a wristband tracking object, etc. In one example, tracking device 104 has location service 105. Location service 105 can be any known or to be developed built-in sensor, device and/or location determining component such as a global positioning system (GPS) device capable of recording geographical coordinates (e.g., latitude and longitude) of tracking device 104 at any given point in time.

While not shown in FIG. 1, tracking device 104, server 112 and any other component of system 100 have other components for enabling communication with other components such as transceivers.

The system 100 further includes a destination 106. Destination 106 can be a target location that is to receive arrival alerts from server 112 informing an operator thereof of the timing of user 102's arrival at destination 106. For example, destination 106 can be a brick-and-mortar store, from which user 102 has ordered item(s) for purchase and is en route to pick up the order. Therefore, it is important for server 112 to provide an arrival alert to destination 106 at a threshold time ahead of the arrival of user 102 (e.g., 8 minutes prior to user's arrival at destination 106) to ensure that the ordered item(s) is/are ready when user 102 arrives at destination 106. Therefore, the arrival alert needs to be as accurate as possible to avoid or reduce inconveniences (e.g., waiting for the ordered item(s) to be prepared for a period of time after arrival) experienced by user 102 and/or an operator at destination 106.

In another example, destination 106 can be any location that user 102 is going to visit or is currently visiting including, but not limited to, a restaurant, a department store, other types of service providers such as dry cleaning services, a library, etc.

Destination 106 can have an operator 108 associated therewith such as an employee. Furthermore, destination 106 can have a computing device 110 with which operator 108 interacts to receive arrival alerts, send and receive identifying information to server 112 and/or track device 104, confirm/cancel/adjust orders, etc. Computing device 110 can be any known or to be developed device that is used by destination 106 and is capable of communicating with server 112 over a wired and/or wireless connection such as a WiFi connection. Examples of computing device 110 include, but are not limited to, a tablet, a stationary computer device, a mobile device, any other known or to be developed Point of Sale (POS) devices, etc.

System 100 also includes server 112. Server 112 can have one or more processors such as processor 114 capable of implementing one or more sets of computer-readable instructions stored in one or more memories such as memory 116. Execution of any one or more of these sets of instructions enable server 112 to implement functionalities of methods described below with reference to FIGS. 3-5. These functionalities include, but are not limited to, building destination specific models using machine learning, which can then be used to provide arrival prediction services, determining smart signaling for location receiving location updates, etc.

As shown in FIG. 1, server 112 can also have database 118 (can also be referred to as past trips database 118). Data stored in database 118, as will be described below, will be used by machine learning algorithms implemented by server 112 to build destination specific models and perform arrival prediction services.

In one example, server 112 can communicate with third party platforms such as third party platform 122 to provide third-party sponsored content to tracking device 104 and/or destination 106. In another example, server 112 can itself be a content provider. The providing of content using location information of tracking device 104 or destination 106 will be further described below.

System 100 can also include routing engine 120. Routing engine 120 can be any conventional routing engine such as those commonly associated with mapping applications. Such routing engines may take into account distance to a destination and speed limits and in some cases current traffic, weather and time of day conditions in providing preliminary arrival times to server 112, which will be used by server 112 and logics implemented thereon to refine, revise and provide arrival alerts to destination 106. Furthermore, routing engine 120 may or may not account for other location specific factors such as most likely routes to the destination, likely stops along the way and any other learned factors for generating destination specific models for destinations at server 112.

Server 112 and routine engine 120 can be co-located physically or be configured to communicate over wired and/or wireless networks. Furthermore, each identified component of system 100 can communicate with other components of system 100 and/or any other external component using currently known or to be developed cellular and/or wireless communication technologies and platforms.

System 100 can also include a third party platform 122. Third party platform 122 can communicate with server 112 via any known or to be developed wired and/or wireless network. Third party platform 122 can be any known or to be developed content provider (e.g., a merchant, an e-commerce organization, etc.) that provides products for sale to users and customers. Third party platform 122, as will be described below, can communicate with server 112 to utilize services offered by server 112 in determining location information of user devices (e.g., tracking device 104) and using the same for providing targeted content to tracking device 104. While FIG. 1 illustrates a single third party platform 122, the present disclosure is not limited to just one and may include two or more third party platforms 122 utilizing services of server 112, as will be described below.

Figure 2:
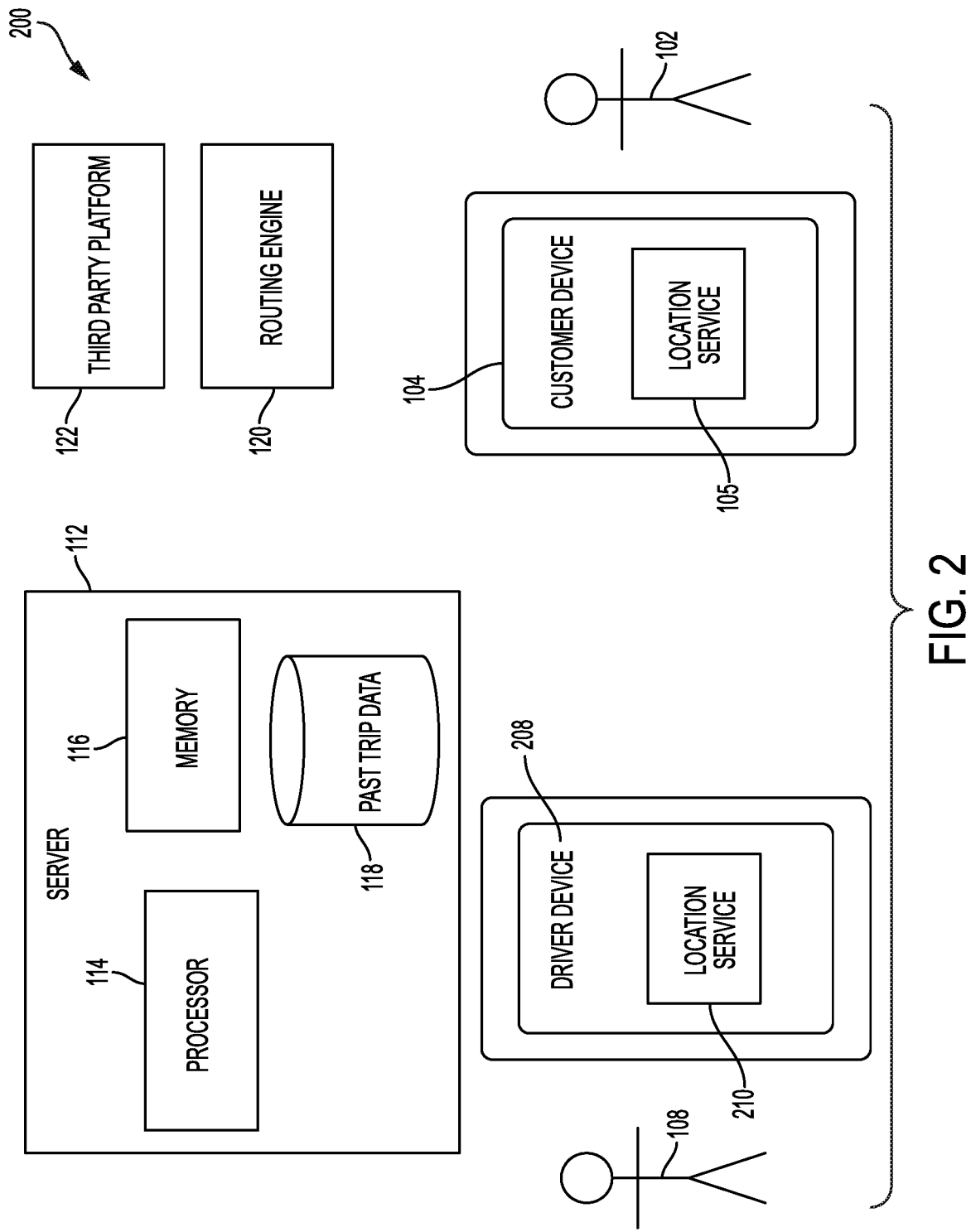
FIG. 2 shows an example system, in accordance with one aspect of the present disclosure.

FIG. 2 illustrates an example system, in accordance with one aspect of the present disclosure. System 200 of FIG. 2 is the same as system 100 of FIG. 1 except that instead of having user 102 travel to destination 106 to pick up item(s)/service(s) ordered as shown in FIG. 1, a destination such as destination 106 utilizes a delivery service (e.g. that of a driver) to deliver user 102's order(s) to user 102. Therefore, components of system 200 that have the same numerical reference as those in FIG. 1 will not be further described for sake of brevity.

In system 200 shown in FIG. 2, instead of destination 106 and its corresponding components, a driver 206 having an associated tracking device 208 is illustrated. In the context of FIG. 2, driver 206 and associated tracking device 208 is moving toward user 102 (similar to user 102 and tracking device 104 in FIG. 1) while user 102 is stationary (similar to destination 106 in FIG. 1). Accordingly, in the context of FIG. 2, an arrival alert is provided to user 102 informing user 102 of arrival of driver 206. Therefore, various types of calculations for location determination as described in this application, are performed for determining location of tracking device 208 and estimating its arrival at user 102.

Driver 206 and tracking device 208 can be associated with a moving object such as a vehicle operated by driver 206. Tracking device 208 can be any known or to be developed electronic device capable of tracking a movement of the driver 206 (and the associated moving object) and communicate the same with server 112 over a wired and/or wireless communication platform such as over a cellular network or a WiFi connection. Examples of tracking device 208 include, but are not limited to, a cellular phone, a personal digital assistant (PDA), a laptop, a tablet, a wristband tracking object, etc. Location service 210 of tracking device 208 can be the same as location service 105 of tracking device 104 (identified as customer device 104 in FIG. 2) described above with reference to FIG. 1.

While in FIGS. 1 and 2 various components are illustrated and described, inventive concepts are not limited thereto. For example, the number of users, devices, destinations, servers, third party platform(s), etc., are not limited to those described and can be more or less. Furthermore, both systems 100 and 200 can have additional components, architecture and/or functionalities associated therewith that are ordinary and/or necessary for proper operations thereof and thus are within the scope of the present disclosure.

Furthermore, while FIGS. 1 and 2 are two examples of systems in which the concepts described below can be implemented, the present disclosure is not limited thereto. For example, a system in which the present concepts can be implemented need to necessarily involve a tracking device or a driver device traveling to a destination or to a customer device but can simply be a server such as server 112 tracking a moving object such as tracking device 104, driver device 208, etc.

As briefly mentioned above, server 112 is tasked with tracking a moving object associated with user 102. Information regarding a tracked object may be utilized for various purposes including, but not limited to, content conversion tracking, providing arrival alerts to an intended destination for an impending arrival of the moving object at the intended destination (e.g., in order to provide an alert to destination 106 at a threshold time ahead of user 102's arrival at destination 106, so that operator 108 at destination 106 can prepare and ready order(s) for user 102 to pick up when he or she arrives at destination 106), etc.

Server 112 implements various techniques to improve the accuracy of determining a location of a moving object such as tracking device (customer device) 104. For example, server 112 applies machine learning to various statistical data to create destination specific model(s) for destination 106. Various statistic data can include, but is not limited to, past completed trips of users to destination 106, past completed trips of user 102, traffic conditions, modes of transportation, types of moving objects associated with user 102 (and/or driver 206 in FIG. 2), weather conditions, times of days, events taking place en route to destination 106 or at destination 106, speed of the moving object, any construction, road closures and improvement, historical stops made by user 102 on such route and/or purchases made en route, etc. The statistical data can be stored in database 118.

For example, a particular brick-and-mortar store maybe located in a downtown area where traffic conditions vary greatly depending on time of day. Server 112 takes this information into consideration to build a destination specific model for the brick-and-mortar store located in the downtown area. Accordingly, in determining location information of user 102 as user 102 travels to the downtown location of the brick-and-mortar store and depending on the time of day, server 112 can augment its prediction and improve the determination of location information of user 102 using the corresponding destination specific model and/or other historical data in database 118 corresponding to visits/stops of user 102 en route. For example, user 102 may typically stop at a particular gas station or a particular convenient store whenever user 102 visits the brick-and-mortar store. Such information is also taken into consideration by server 112 in determining location information of user 102.

Figure 3:
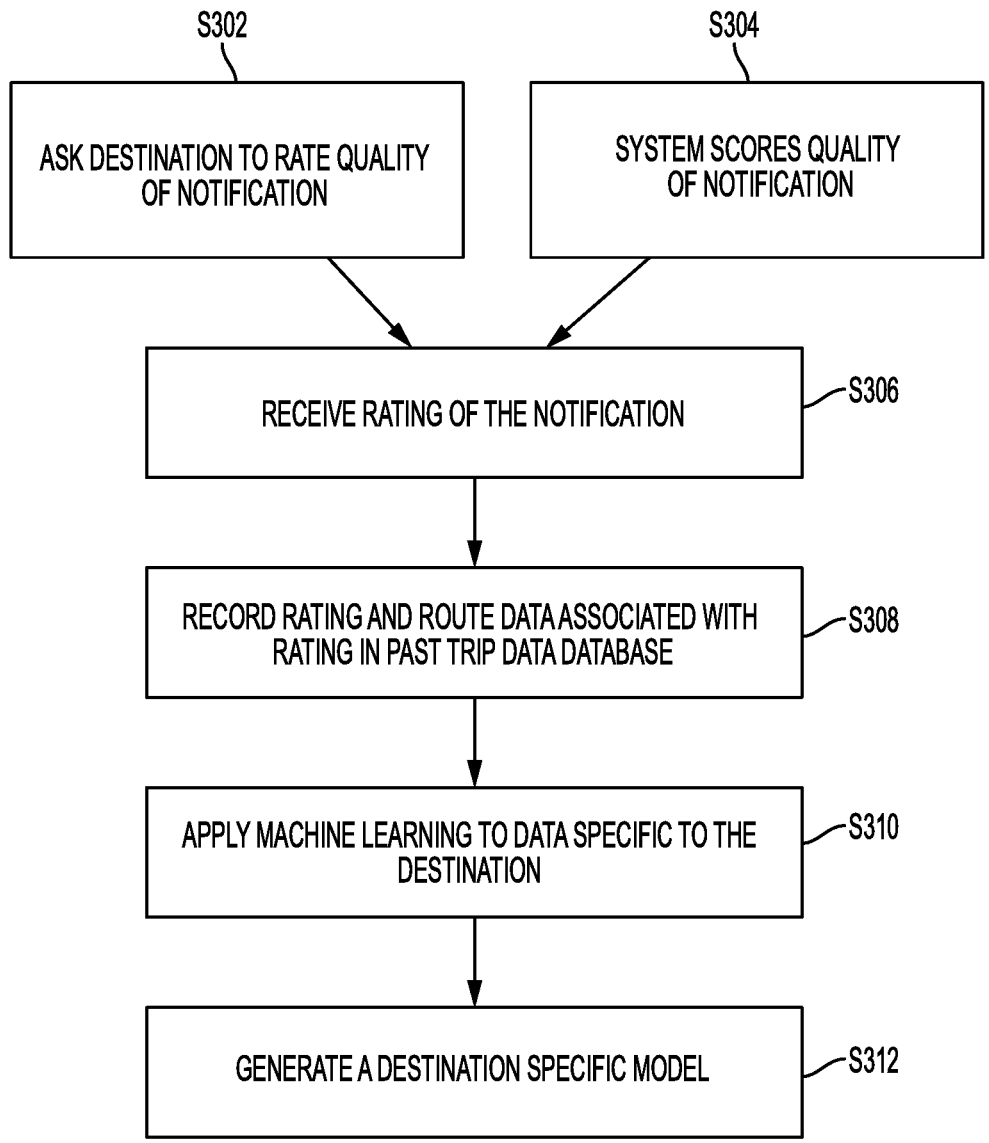
FIG. 3 illustrates an example method of creating destination specific models, in accordance with one aspect of the present disclosure.

FIG. 3 illustrates an example method of creating destination specific models, in accordance with one aspect of the present disclosure. FIG. 3 will be described with reference to FIG. 1. However, the concepts described are equally applicable to the system of FIG. 2 as well. The method illustrated in FIG. 3 begins after one or more notifications have been provided to destination computing device 110 regarding an arrival prediction of user 102 at destination 106 to pick up order(s) (or one or more trips to destination 106 have been completed). Server 112 can store a collection of data in database 118. The data can be any one or more of statistical data examples provided above. In addition, server 112 can store information regarding the quality of past notifications and an identifier of the past notifications. For example, every time server 112 has provided an arrival alert to destination 106 indicating that user 102 will arrive in 8 minutes, server 112 compares this estimated arrival time to an actual time it took user 102 to arrive at destination 106. For example, while server 112 predicted, at time T0, that user 102 will arrive at destination 106 in 8 minutes, in reality, it may take user 102 6 minutes from T0 to arrive at destination 106. This indicates a prediction error of 25%. Server 112 stores this prediction error in database 118. During the next round of prediction and in providing the arrival alert, server 112 adjusts its prediction by 25% before providing the arrival alert (e.g., in the particular example described above, instead of providing the arrival alert at T0, server 112 now provides the arrival alert at T1 which is 2 minutes earlier than T0).

At S302, server 112 queries computing device 110 of destination 106 for rating a quality of a recently provided arrival alert. Operator 108 operating destination computing device 110 can respond to the query. Upon receiving the response, server 112 stores the rating at S306. In addition to, simultaneous with or instead of querying computing device 110 for rating, at S304, server 112 can calculate a rating or prediction error regarding the arrival alert, as described above. Similarly, the calculated rating is received at S306.

At S308, server 112 can record the received rating(s), per S302 and S304, in database 118 in association with an identification (ID) of the notification. The ID can be an identification of a particular transaction between user 102 and a merchant at destination 106, can be an identification associated with user 102, can be an identification associated with destination 106 or any combination thereof.

Server 112 can also store in database 118, information regarding a route taken by user 102 in connection with a recently completed trip to destination 106, and any other data pertinent to the trip that resulted in the notification. The route taken by user 102 can be learned from data reported by location service 105 to server 112 while user 102 and associated computing device 104 were traveling to destination 106. In some examples, from this route information, server 112 can determine if user 102 made any stops while in route to destination 106. Server 112 can also record a time of day, day of week, and date associated with the notification in database 118. Server 112 can aggregate the above data for trips by many users.

At S310, server 112 applies machine learning algorithm(s) to the historical data specific to destination 106 stored in database 118. At S312, server 112 generates destination specific model for destination 106 based on the machine learning algorithm(s) applied to stored data at S310. In one example, destination specific model may be created or trained by analyzing factors associated with notifications that were considered of good quality and factors associated with notifications that were considered of poor quality. Since the destination specific model is generated through machine learning, some dimensions of destination specific model may not have any semantic meaning while some dimensions may have a semantic significance. For example, those dimensions having a semantic meaning can include likelihood that a user will make other stops along the route, likelihood that a user will encounter traffic along the route, the most likely routes to the destination, etc.

In some examples, machine learning may initially be trained on all data in database 118 regardless of destination to result in a location non-specific model. In such examples, destination specific model may be the result of tuning the location non-specific model for factors relevant to the specific destination 106.

As can be seen from the above description, server 112 relies on location updates received from tracking device 104 in order to determine current location of user 102.

The location updates received from tracking device 104 can be GPS signals (satellite signals) readings obtained by a GPS tracking device embedded in tracking device 104.

Server 112, by relying on data obtained from external sources such as a public database, may have a record of precise geographical coordinates of any given geographical location (latitude and longitude values). Such precise geographical coordinates may be referred to as registered geographical coordinates or simply registered coordinates of a given geographical location. Therefore, every time server 112 receives a GPS signal reading from tracking devices, server 112 can compare the GPS reading received, which includes latitude and longitude values of the corresponding geographical location, with the registered geographical coordinates of the same location. If the difference between any two of the received and registered latitude and longitude values two are within a threshold (e.g., less than 5 meters, 10 meters, within a margin of error of less than 5%, 10%, etc.), the server 112 would then consider the received coordinates as "precise".

Based on the above and over time, server 112 can build up a database of geographical areas in which average error of received GPS signals readings from tracking devices are not "precise". These geographical areas may be stored at server 112 and may be referred to as high error zones. Thereafter, whenever a tracking device is located within a high error zone, and as will be discussed below, any sparse "precise" GPS readings received from said tracking device may be used as a reference point after which determination of movement and hence the location of the tracking device may be augmented using on-board sensors and displacement/location calculations (information) of the tracking device. This can improve the location updates of the tracking device received at the server 112.

While using on-board sensor data can accommodate for inaccuracies in GPS signal readings when tracking device 104 is located in a high error zone, even when such GPS signal readings are "precise," reliance on GPS signal readings alone may be insufficient to track and record relatively small movements of tracking device 104. For example, GPS signal readings may be insufficient to differentiate between a tracking device's presence in two adjacent stores or two stores located on top of each other on different levels of a mall, etc. This deficiency can translate into missing user 102's presence in one store (for which an advertisement was pushed/provided to tracking device 104) and inadvertently determining user 102's presence in an adjacent store (for which no advertisement was pushed/provided to tracking device 104), which can in turn result in inaccurate determination of content conversion rates for the advertisement pushed/provided to tracking device 104.

Augmenting GPS signal readings with data from on-board sensors of a tracking device not only provides the above described advantage, it can also be used to send more targeted content to the tracking device as will be described below.

Figure 4:
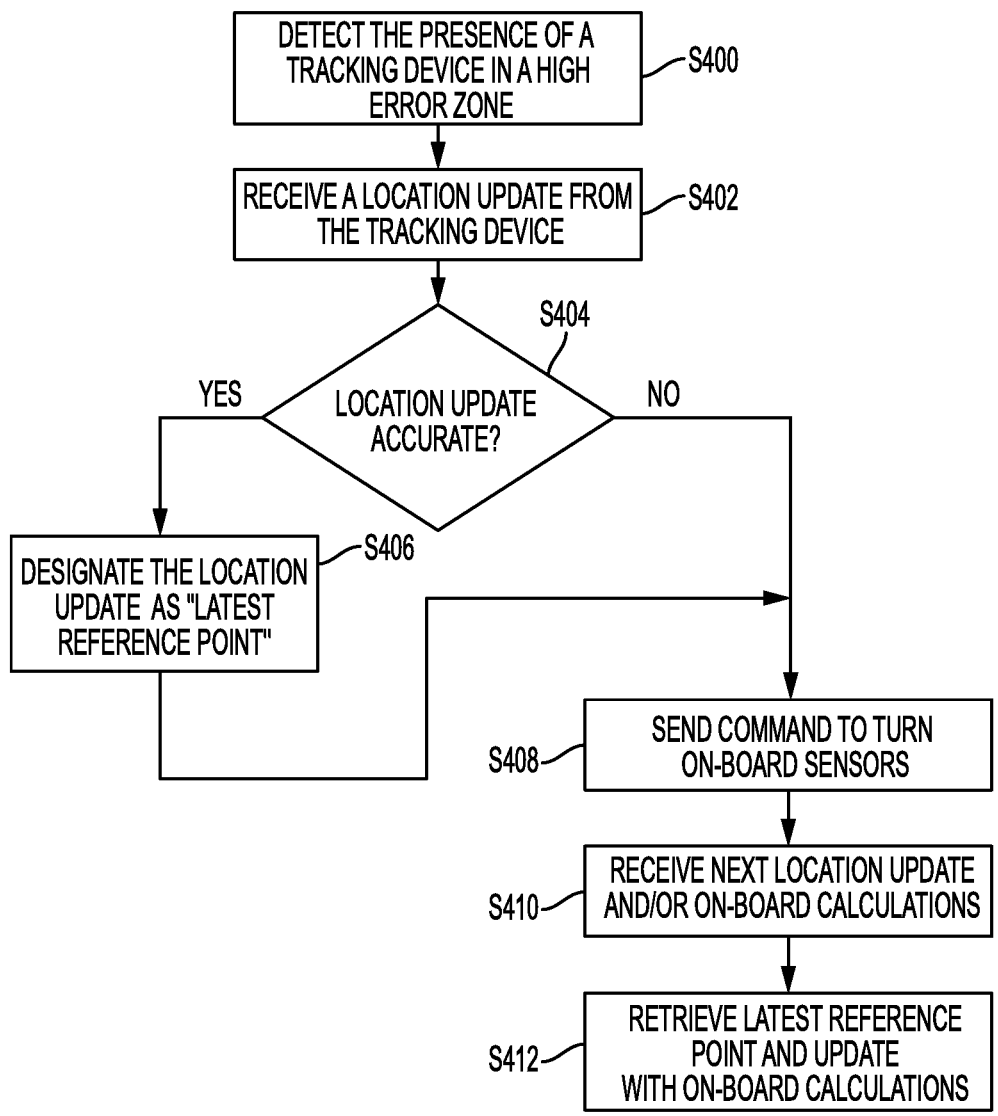
FIG. 4 illustrates an example method of location determination using on-board sensor-data, in accordance with one aspect of the present disclosure.

FIG. 4 illustrates an example method of location determination using on-board sensor-data, in accordance with one aspect of the present disclosure. FIG. 4 will be described from the perspective of server 112 and with reference to FIGS. 1-3. However, it is understood by those skill in the art that one or more processors such as processor 114 of server 112 executes computer readable instructions stored on or more memories such as memory 116 to implement the functionalities described below.

At S400, server 112 detects that tracking device 104 is in a high error zone. In one example, server 112 detects the presence of tracking device 104 in the high error zone based determining that the latest location update (or average of a predetermined number of location updates recently received from tracking device 104) corresponds to one or more geographical areas identified as high error zones by server 112, as described above.

At S402, server 112 receives a location update (e.g., a GPS signal reading) from tracking device 104 that may be indicative of a current location (geographical coordinates) of tracking device 104.

At S404, server 112 determines if the location update (GPS signal) received from tracking device 104 at S402, after detecting the presence of the tracking device 104 in the high error zone, is accurate ("precise"). In one example, this accuracy determination is based on comparing the coordinates of a current location of the tracking device indicated in the received location update to registered coordinates of the same location at server 112. If the received coordinates (either longitude value or the latitude value or combination of both) are within a threshold of the registered coordinates (e.g., having an error that is less than a threshold such as 1%, 2%, 5% or a difference of less than 5 meters/miles, 10 meters/miles, etc.), then server 112 determines that the location update is accurate.

If at S404, server 112 determines that the recently received location update is accurate, at S406, server 112 updates its record of current location of tracking device 104 using the received current location and registers (stores) the current location as the "latest precise location" or the "latest reference point". Thereafter, the process proceeds to S408, which will be described below.

Referring back to S404, if at S404, server 112 determines that the received location update is not accurate, then server 112 simply uses the last received accurate or precise location update as the "latest reference point."

At S408, server 112 sends commands to tracking device 104 to turn on (activate) its on-board sensors to be used for tracking movement of the tracking device 104. Examples of such on-board sensors include, but are not limited to, gyroscope, accelerometer, magnetometer, etc. In response to the commands, tracking device 104 enables said sensors and can collect movement and location data to perform calculations on-board in order to determine the amount of displacement of tracking device 104 since activation of the sensors. These calculations can be done according to any known or to be developed method.

At S410 and at the time of providing next location update by tracking device 104, server 112 also receives the calculations performed on board tracking device 104 (may be referred to as displacement information)

At S412, server 112 retrieves the "latest reference point" (e.g., stored at S406 described above) and updates the same with the displacement information received at S410. In one example, if the process of FIG. 4, has never reached S406 (e.g., an accurate or precise location update has never been received by server 112 for tracking device 104), then at S412, server 112 uses the location update of S402 instead of the "latest reference point of S406 and updates the location update from S402 with the displacement information received at S410.

In one example, the updating may also be based on the destination specific model for destination 106 that sever 112 may have generated for destination 106 per the process of FIG. 3. For example, the specific destination model for destination 106 may include information on correlation between traffic (e.g., average speed and time) on a current route of which user 102 and tracking device 104 are travelling to destination 106 and time of day. Therefore, if a particular time period (e.g., afternoon rush hour between 4 PM to 6 PM) is associated with a 10% slower traffic on the current route and the current time (as the user 102 is traveling to destination 106) falls within such time period, then server 112 may update the "latest reference point" with the displacement information and/or an additional factor of 10% due to the relatively slower traffic.

By implementing the method of FIG. 4, better and more accurate location updates from tracking device 104 is obtained by server 112, which can be used to improve the types of content and targeting thereof to tracking device 104.

In another example embodiment, a high error zone may not necessarily be in a downtown area or an area with structures that block GPS signals. Instead a high error zone may be a geographical area (may be an open field or a remote region), where signal reception and strength of GPS signals are weak or less than a threshold amount of strength. Accordingly, the process of FIG. 4 is equally applicable to such remote or open field example of a high error zone.

As mentioned above, there can be scenarios in which server 112 can act as a content provider, where examples of contents include, but are not limited to, advertisements, coupons, promotions etc. Additionally, server 112 can act as an intermediary for providing (pushing) content provided by third party platform 122 to tracking device 104.

Currently, content providing systems target users with advertisements or coupons based on an estimated geographical location of a tracking device. For example, when a user is detected to be present in a mall, existing content providers provide the user with advertisements, coupons, promotions, etc. for all merchants operating in the shopping mall, regardless of the exact location of the user. Location determination based on on-board sensor data can improve the accuracy of a user's determined location and thus help provide more targeted advertisements to the user.

Figure 5:
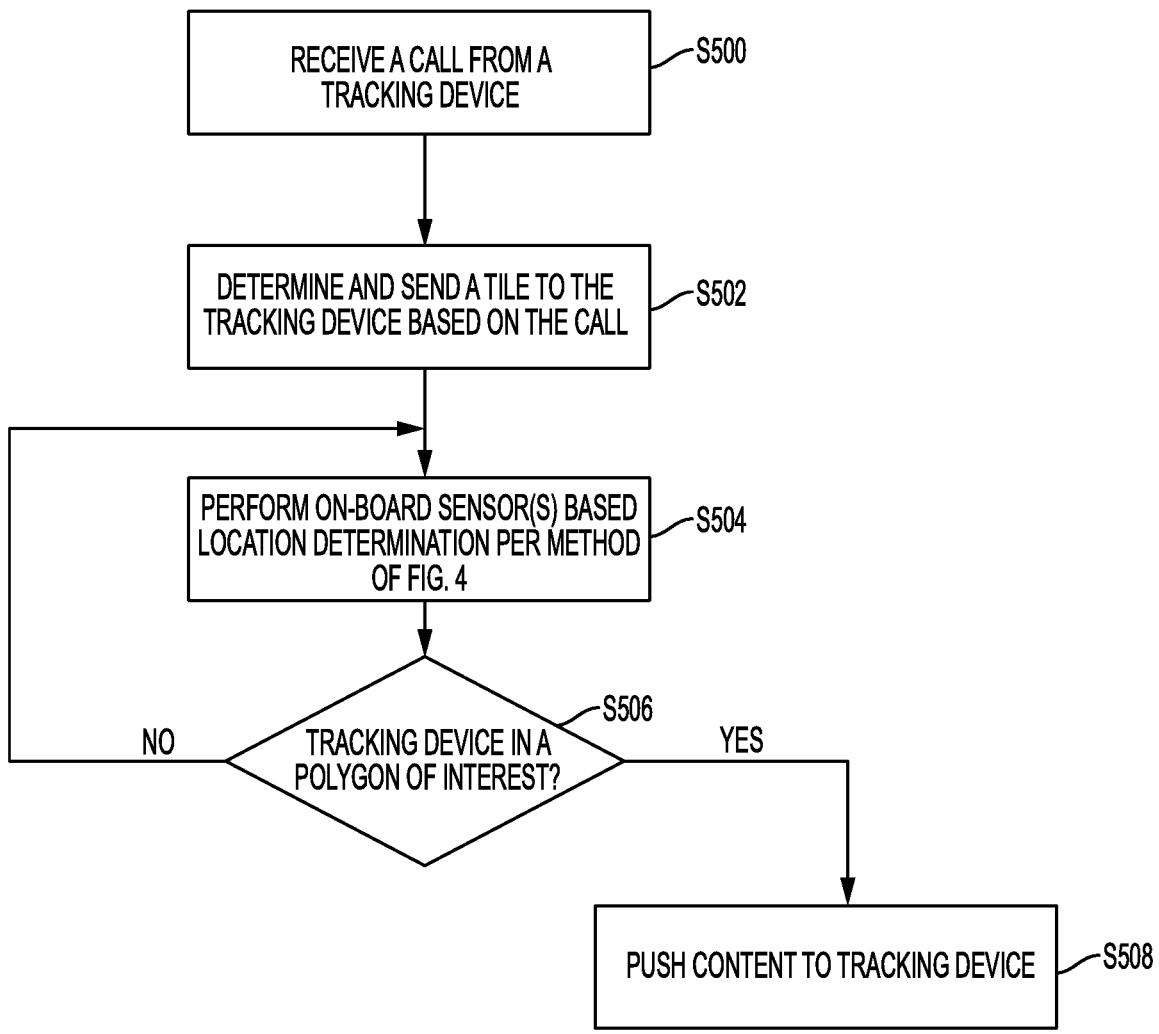
FIG. 5 is an example method of content providing based on location determination using on-board sensor data, in accordance with one aspect of the present disclosure.

FIG. 5 is an example method of content providing based on location determination using on-board sensor data, in accordance with an aspect of the present disclosure. FIG. 5 will be described from the perspective of server 112 and with reference to FIGS. 1-4. However, it is understood by those skill in the art that one or more processors such as processor 114 of server 112 executes computer readable instructions stored on or more memories such as memory 116 to implement the functionalities described below.

At S500, server 112 receives a call from user 102 via tracking device 104. In one example, the call may be the same as a location update provided by the tracking device 104 to the server 112, as described above.

At S502 and upon receiving the call, server 112 determines a tile (geographical tile) associated with the location update of tracking device 104 received at S500 and provides the same to the tracking device 104. In one example, a tile identifies coordinates/boundaries of a geographical location.

Server 112 may have a database of tiles stored thereon. A tile can identify a specific geographical area. For example, server 112 can divide a city or a downtown area into several tiles/sections (e.g., square tiles, polygon tiles, etc.) spanning the entire city or downtown area.

Server 112 determines (selects) the tile to be provided to tracking device 104 based on the location update received from tracking device 104 as part of the call at S500. In one example, a tile can include polygons of user 102's interests. For example, such polygons include a foot print of a particular store, foot prints of locations that offer a particular type of product or services of interest to user 102, etc. Polygons of interest can also be referred to as zones of interest.

At S504, server 112 performs the process of FIG. 4 to determine a location of tracking device 104 within the tile assigned to tracking device at S502, based on GPS signals and on-board sensors of tracking device 104. More specifically and per FIG. 4, the location of tracking device 104 within the tile assigned thereto at S502 is determined based on received GPS signal readings from tracking device 104 and on-board sensors of tracking device 104 turned on for data collection and on-board movement/displacement determination. Accordingly, at S504, server 112 determines an exact location of tracking device 104 within the tile assigned to tracking device 104 at S502 by augmenting the GPS signals with displacement information determined using on-board sensors of tracking device 104.

At S506 and based on the determined location at S504, server 112 determines whether tracking device 104 and user 102 are detected to be within a particular polygon or zone of interest. This can be done by comparing location coordinates of tracking device 104 based on the location determined at S504 and determining if the coordinates fall within (and/or on or within a threshold percentage) of perimeters or boundary of the tile of S502.

A polygon of interest can be, but is not limited to, a particular store location, a restaurant, any type of business location, a museum, a point of interest, etc.

If server 112 determines that the tracking device 104 is not in a polygon of interest associated with the tile, the process reverts back to S506 and server 112 repeats S504 and S506 until tracking device 104 is detected in a polygon of interest.

Upon determining at S506 that user 102 and tracking device 104 are in a polygon of interest, at S508, server 112 can perform a series of content (or at least one content) pushes to tracking device 104 and/or another electronic device associated with user 102 that is capable of receiving notifications, pushes containing contents, etc.

In one example, the content pushed to tracking device 104 includes specific promotions and coupons associated with the polygon of interest. This providing of polygon specific content is enabled due to the fact that server 112 has the 'exact' location of tracking device 104 based on the latest reference point and on-board movement determination at tracking device 104 using sensor data.

In another example, the content pushed can be a specific action to be taken by user 102 within the polygon of interest such as making payment for an order, scheduling next appointment, completing paperwork, etc.

In another example, as will be described with reference to FIG. 6, zone/polygon specific content can be provided to tracking device 104 at S502. Accordingly, tracking device 104 and server 112 need not communicate when tracking device 104 is detected within a polygon of interest. In other words, example contents to be provided to tracking device 104 at S508 can instead be provided to tracking device 104 at S502. Therefore, user 102, through tracking device 104, can automatically get a notification of content, take a particular action such as making an automatic payment, as soon as tracking device 104 is within a particular polygon of interest, without having the content, payment reminders, etc., be pushed to tracking device 104 after tracking device 104 is detected within the corresponding polygon of interest.

In this scenario, server 112 may have a pre-stored database of content for various polygons of interested stored in an associated memory or in the alternative can pull content from third party database(s) upon associated tracking device 104 with a 'tile' at S502.

Figure 6:
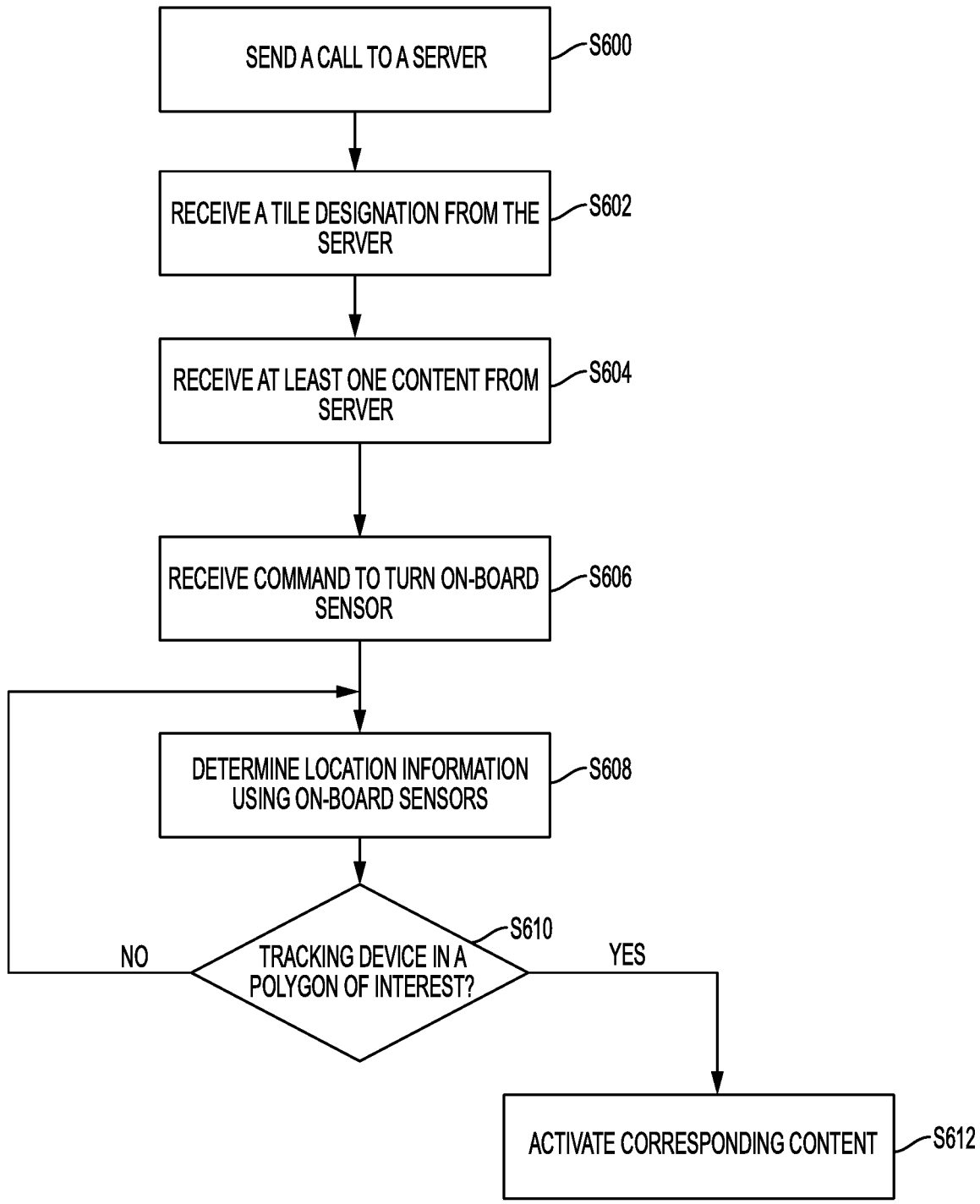
FIG. 6 is an example method of content providing based on location determination using on-board sensor data, in accordance to an aspect of the present disclosure.

FIG. 6 is an example method of content providing based on location determination using on-board sensor data, in accordance with an aspect of the present disclosure. FIG. 6 will be described from the perspective of tracking device 104 and with reference to FIGS. 1-4. However, it is understood by those skill in the art that one or more processors running on tracking device 104 executes computer readable instructions stored on or more memories of tracking device 104 to implement the functionalities described below.

At S600, tracking device 104 sends to server 112 a call on behalf of user 102. In one example, the call may be the same as a location update provided by the tracking device 104 to the server 112, as described above.

At S602, tracking device 104 receives from server 112 a tile designation (geographical tile) associated with the location update of tracking device 104 that is sent to server 112 at S600. As described above, a tile identifies coordinates/boundaries of a geographical location.

Server 112 may have a database of tiles stored thereon. A tile can identify a specific geographical area. For example, server 112 can divide a city or a downtown area into several tiles/sections (e.g., square tiles, polygon tiles, etc.) spanning the entire city or downtown area.

Server 112 determines (selects) the tile to be provided to tracking device 104 based on the location update received from tracking device 104 as part of the call at S600. In one example, a tile can include polygons of user 102's interests. For example, such polygons include a foot print of a particular store, foot prints of locations that offer a particular type of product or services of interest to user 102, etc. Polygons of interest can also be referred to as zones of interest.

At S604, tracking device 104 receives at least one content (a plurality of content) associated with points of interest/polygons of interest within the tile, from server 112. In one example, S604 may be performed simultaneously with S602. The at least one content can be, for example, a promotion associated with a store or a polygon of interest located within the tile. Each of the plurality of content may have location information of a corresponding point of interest associated with the content. For example, a food coupon for a particular restaurant may have location information of the particular restaurant associated with it.

Thereafter, at S606, tracking device 104 receives a command from server 112 to turn on on-board sensors of tracking device 104, as described above. Also at S606, server 112 can send "latest reference point" to tracking device 104. Alternatively, tracking device 104 may have "latest reference point" information already available thereon and thus receiving the same from server 112 may not be necessary.

Thereafter, at S608 and in response to activation of on-board sensors, tracking device 104 determines updated location information of tracking device 104 by calculating displacement information indicative of details of movement of tracking device 104 relative to the "latest reference point" to determine an accurate/exact location of tracking device 104, as described above. This on-device location determination of location will be used for automatic activation or triggering of a corresponding one of the at least one content pushed to tracking device 104 at S604.

At S610, tracking device 104 determines whether the updated location information determined at S608 indicate presence of tracking device 104 within a given zone of interest (polygon of interest) associated with one of the content received at S604. If tracking device 104 determines that tracking device 104 is not within a zone of interest, the process reverts back to S608 and is repeated until tracking device 104 determines its presence in a polygon of interest.

However, if at S610, tracking device 104 determines that it is present in at least one polygon of interest, at S612, tracking device 104 activates a corresponding content. For example, once tracking device 104 determines that it is within a restaurant (an example of a polygon of interest) for which a coupon of 10% off was received at S604, then a notification informing user 102 of the availability of the discount is displayed on a graphical user interface of tracking device 104 or any other device associated with user 102. In another example, once the tracking device 104 is determined to be within a coffee shop, automatic payment for an order may be activated for user 102 to pay for the order using a digital wallet available on tracking device 104 (or a mobile device) of user 102, using known or to be developed methods of online/cardless and digital payments.

Figure 7:
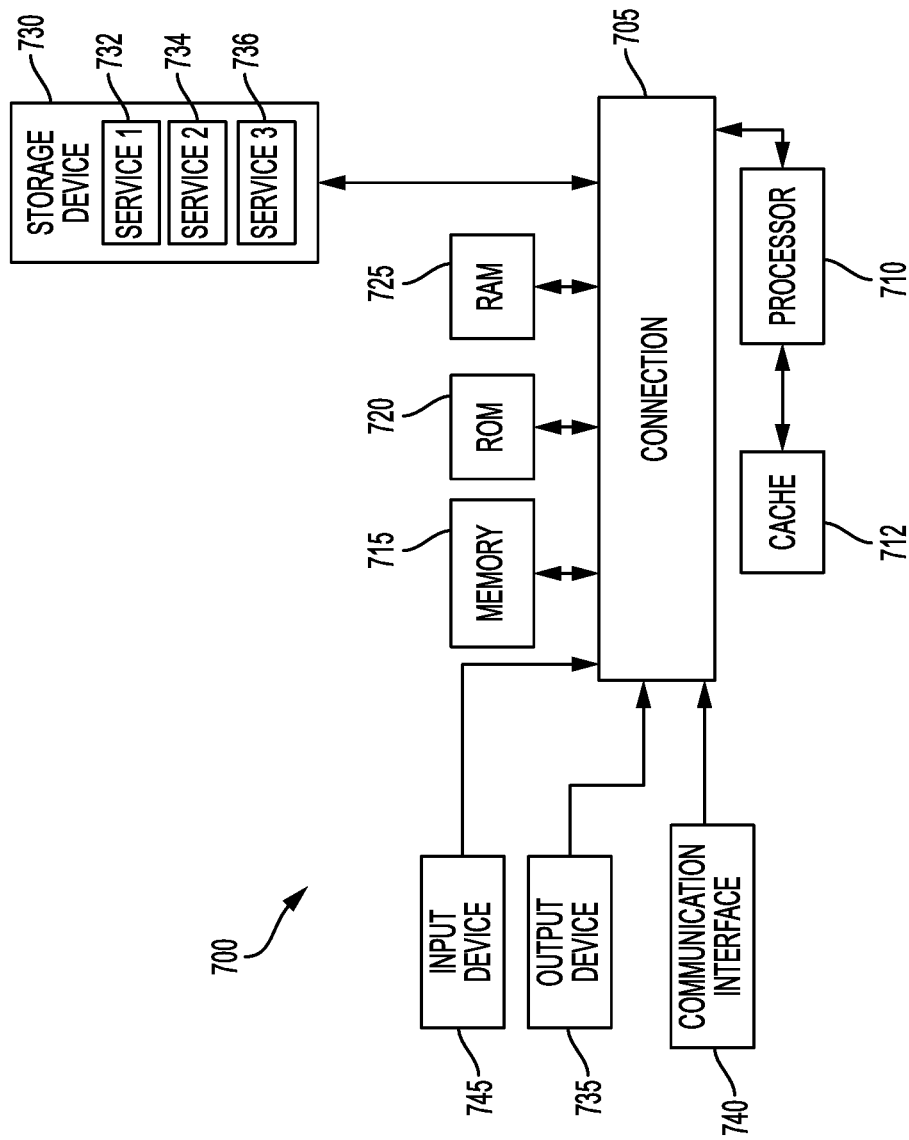
FIG. 7 illustrates example components of a system for implementing the present technologies, in accordance one aspect of the present disclosure.

FIG. 7 illustrates example components of a system for implementing the present technologies, in accordance one aspect of the present disclosure. The system of FIG. 7 illustrates example structure of server 112, tracking device 104 and/or any other components of system 100 or system 200 of FIGS. 1 and 2.

FIG. 7 shows an example of a computing system in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) 720 and random access memory (RAM) 725 to processor 710.

Computing system 700 can include a cache 712 of high-speed memory connected directly with, in close proximity to, or integrated as part of processor 710.

Processor 710 can include any general purpose processor and a hardware service or software service, such as service 1 732, service 2 734, and service 3 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method of targeted content providing, the method comprising:
    assigning a geographical tile to a tracking device, the geographical tile representing a geographical location in which the tracking device is currently located;
    activating at least one sensor on-board the tracking device, the at least one sensor of the tracking device being used to collect location data and determine displacement information of the tracking device within the geographical tile;
    receiving the displacement information as well as at least one satellite based location update from the tracking device;
    determining at least one zone of interest in the tile at which the tracking device is currently located based on the displacement information and at least one satellite based location information of the tracking device; and
    providing at least one content associated with the at least one zone of interest to the tracking device.

2. The computer-implemented method of claim 1, further comprising:
    receiving a call from the tracking device indicating a current location of the tracking device, wherein the assigning of the geographical tile to the tracking device is based on the current location of the tracking device.

3. The computer-implemented method of claim 1, wherein the at least one content is an advertisement, a promotion or a coupon associated with the at least one zone of interest.

4. The computer-implemented method of claim 1, wherein the at least one content is an action to be taken by a user of the tracking device within the at least one zone of interest.

5. The computer-implemented method of claim 1, wherein the at least one satellite based location update includes geographical coordinates of a current location of the tracking device that are within a threshold of registered geographical coordinates for the current location and available to a server.

6. The computer-implemented method of claim 1, further comprising:
receiving the at least one content from a third party content provider.

7. A device comprising:
memory having computer-readable instructions stored therein; and
one or more processors configured to execute the computer-readable instructions to:
receive a geographical tile from a server, the geographical tile representing a geographical location in which the device is currently located;
receive a plurality of content associated with the geographical tile from the server;
determine displacement information of the device within the tile using a reference point and displacement data obtained via at least one on-board sensor of the device;
determine a presence of the device within a zone of interest in the tile based on the displacement information; and
activate at least one content corresponding the zone of interest.

8. The device of claim 7, wherein the reference point is location information of the device based on a received Global Positioning System (GPS) signal.

9. The device of claim 7, wherein the at least one on-board sensor is one of an accelerometer, a gyroscope or a magnetometer of the device.

10. The device of claim 7, wherein the one or more processors are configured to execute the computer readable instructions to:
send a call to the server indicating at least a current location of the device; and
receive the geographical tile in response to the call.

11. The device of claim 7, wherein the plurality of content includes an action to be taken by a user of the device within the zone of interest.

12. The device of claim 7, wherein the plurality of content include an advertisement, a promotion or a coupon.

13. The device of claim 12, wherein the zone of interest is a point of interest associated with one or more of the plurality of content.

14. The device of claim 7, wherein the one or more processors are configured to execute the computer readable instructions to receive the plurality of content from a third party content provider.

15. A server comprising:
memory having computer-readable instructions stored therein; and
one or more processors configured to execute the computer-readable instructions to:
assign a geographical tile to a tracking device, the geographical tile representing a geographical location in which the tracking device is currently located;
activate at least one sensor on-board the tracking device, the at least one sensor of the tracking device being used to collect location data and determine displacement information of the tracking device within the geographical tile;
receive the displacement information as well as at least one satellite based location update from the tracking device;
determine at least one zone of interest in the tile at which the tracking device is currently located based on the displacement information and at least one satellite based location information of the tracking device; and
provide at least one content associated with the at least one zone of interest to the tracking device.

16. The server of claim 15, wherein the one or more processors are configured to execute the computer readable instructions to:
receive a call from the tracking device indicating a current location of the tracking device, wherein assigning of the geographical tile to the tracking device is based on the current location of the tracking device.

17. The server of claim 15, wherein the at least one content is an advertisement, a promotion or a coupon associated with the at least one zone of interest.

18. The server of claim 15, wherein the at least one content is an action to be taken by a user of the tracking device within the at least one zone of interest.

19. The server of claim 15, wherein the at least one satellite based location update includes geographical coordinates of a current location of the tracking device that are within a threshold of registered geographical coordinates for the current location and available to the server.

20. The server of claim 15, wherein the one or more processors are configured to execute the computer readable instructions to receive the at least one content from a third party content provider.

* * * * *